US012661775B2

(12) United States Patent
Hong et al.

(10) Patent No.: US 12,661,775 B2
(45) Date of Patent: Jun. 23, 2026

(54) TOOL BOX FOR HAND-HELD POWER TOOL

(71) Applicant: Robert Bosch GmbH, Stuttgart (DE)

(72) Inventors: Zheyan Hong, Suzhou (CN); Chia Chun Kang, Penang (MY); Yen Tiong Tan, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 18/475,337

(22) Filed: Sep. 27, 2023

(65) Prior Publication Data

US 2024/0100683 A1 Mar. 28, 2024

(30) Foreign Application Priority Data

Sep. 28, 2022 (DE) .................... 10 2022 210 256.8

(51) Int. Cl.
*B25H 3/00* (2006.01)

(52) U.S. Cl.
CPC ............ *B25H 3/006* (2013.01); *B25H 3/003* (2013.01)

(58) Field of Classification Search
CPC ........... B25H 3/006; B25H 3/003; B25H 3/00
USPC ......................................... 206/349, 379, 373
See application file for complete search history.

(56) References Cited

U.S. PATENT DOCUMENTS

| | | | | | |
|---|---|---|---|---|---|
| 3,339,781 | A * | 9/1967 | Confer | A45C 5/02 | 190/18 R |
| 3,371,975 | A * | 3/1968 | Meltzer | B25H 3/006 | 206/349 |
| 3,822,083 | A * | 7/1974 | Zeamer | A45C 5/03 | 312/208.4 |
| 4,917,239 | A * | 4/1990 | Smith | B25H 3/006 | 206/349 |
| 4,927,021 | A * | 5/1990 | Taylor | B25H 3/022 | 220/555 |
| 5,190,154 | A * | 3/1993 | Reusch | B25H 3/003 | 206/375 |
| 5,203,469 | A * | 4/1993 | Chang | B25H 3/003 | 220/555 |
| 5,271,501 | A * | 12/1993 | Chen | B25H 3/06 | 206/373 |
| 5,368,164 | A * | 11/1994 | Bennett | B25H 3/06 | 206/379 |
| 5,533,843 | A * | 7/1996 | Chung | B25H 3/04 | 206/349 |
| 5,570,784 | A * | 11/1996 | Sidabras | B25H 3/003 | 206/378 |
| 5,769,260 | A * | 6/1998 | Killinger | A45C 13/02 | 220/4.23 |

(Continued)

FOREIGN PATENT DOCUMENTS

| | | |
|---|---|---|
| DE | 10 2004 060 294 A1 | 6/2006 |
| DE | 10 2005 052 427 A1 | 5/2007 |

(Continued)

*Primary Examiner* — Prince Pal
(74) *Attorney, Agent, or Firm* — Maginot, Moore & Beck LLP

(57) ABSTRACT

A tool box includes a base element and a cover. The base element and the cover form a box interior for receiving at least one hand-held power tool. The tool box further includes a locking tab for locking the cover to the base element. The locking tab includes an insertion tool holding device for holding at least one insertion tool.

17 Claims, 4 Drawing Sheets

(56) References Cited

U.S. PATENT DOCUMENTS

| | | | | | |
|---|---|---|---|---|---|
| 5,826,718 | A * | 10/1998 | Ahern, Jr. | B25H 3/02 | 220/521 |
| 6,105,767 | A * | 8/2000 | Vasudeva | B25H 3/023 | 206/349 |
| 6,105,770 | A * | 8/2000 | Vasudeva | B25H 3/06 | 206/755 |
| 6,267,238 | B1 * | 7/2001 | Miller | B25H 3/006 | 206/349 |
| 6,571,949 | B2 * | 6/2003 | Burrus, IV | B60R 9/00 | 224/404 |
| 6,662,945 | B1 * | 12/2003 | Chang | H04B 1/086 | 455/344 |
| 6,789,670 | B2 * | 9/2004 | Cooper | B25H 3/006 | 206/349 |
| 8,267,247 | B1 * | 9/2012 | Horiyama | B25H 3/025 | 220/843 |
| 8,678,185 | B1 * | 3/2014 | Lin | B25H 3/003 | 220/345.3 |
| 8,899,416 | B2 * | 12/2014 | McDonnough | A45C 13/02 | 425/535 |
| 9,248,566 | B2 * | 2/2016 | Horiyama | B25H 3/027 | |
| 9,512,648 | B2 * | 12/2016 | Lin | B25H 3/02 | |
| 10,468,755 | B2 * | 11/2019 | Williams | H05K 7/186 | |
| 10,574,067 | B1 * | 2/2020 | Hanson | B25H 3/02 | |
| 11,622,668 | B2 * | 4/2023 | Onodi | A47L 23/02 | 134/6 |
| 11,685,038 | B2 * | 6/2023 | Lai | B25H 3/003 | 206/373 |
| 11,759,942 | B2 * | 9/2023 | Hohl | B25H 3/06 | 206/379 |
| 2002/0074255 | A1 * | 6/2002 | Lee | B25H 3/003 | 206/378 |
| 2003/0089630 | A1 * | 5/2003 | Cooper | B25H 3/006 | 206/349 |
| 2003/0205493 | A1 * | 11/2003 | Chen | B25H 3/003 | 206/378 |
| 2004/0065574 | A1 * | 4/2004 | Hernandez, Jr. | B25H 3/023 | 206/373 |
| 2004/0069668 | A1 * | 4/2004 | Finnigan | B25H 3/003 | 206/378 |
| 2004/0125597 | A1 * | 7/2004 | Einav | F21L 4/005 | 362/154 |
| 2004/0144671 | A1 * | 7/2004 | Hallee | B25H 3/003 | 206/373 |
| 2004/0200749 | A1 * | 10/2004 | Wang | B25H 3/003 | 206/349 |
| 2005/0031458 | A1 * | 2/2005 | Brashears | B25H 3/006 | 417/313 |
| 2005/0247586 | A1 * | 11/2005 | Chen | B25H 3/02 | 190/122 |
| 2006/0169613 | A1 * | 8/2006 | Roesler | B25H 3/003 | 206/379 |
| 2006/0186007 | A1 * | 8/2006 | Dost | B25H 3/003 | 206/379 |
| 2006/0196793 | A1 * | 9/2006 | Pendergraph | B25H 3/023 | 206/372 |
| 2006/0201834 | A1 * | 9/2006 | Lutz | B25H 3/006 | 206/372 |
| 2006/0201835 | A1 * | 9/2006 | Shih | B25H 3/023 | 206/373 |
| 2007/0095690 | A1 * | 5/2007 | Nguy | B25H 3/006 | 206/372 |
| 2008/0017537 | A1 * | 1/2008 | Inskeep | A45C 5/03 | 220/555 |
| 2008/0060967 | A1 * | 3/2008 | Chang | B25F 5/006 | 206/521 |
| 2008/0164842 | A1 * | 7/2008 | Bergner | B25H 3/006 | 320/111 |
| 2008/0210593 | A1 * | 9/2008 | Cornwell | B25H 3/003 | 206/234 |
| 2009/0250365 | A1 * | 10/2009 | Goto | B25H 3/02 | 206/349 |
| 2009/0314674 | A1 * | 12/2009 | Sauerheber | B25H 3/021 | 206/373 |
| 2011/0005951 | A1 * | 1/2011 | Baumgartner | B25H 3/006 | 165/59 |
| 2011/0011760 | A1 * | 1/2011 | Habersetzer | G06F 1/1628 | 206/320 |
| 2011/0048988 | A1 * | 3/2011 | Kotula | B25H 3/02 | 206/372 |
| 2012/0273377 | A1 * | 11/2012 | Amatrudo | B25H 3/006 | 53/445 |
| 2012/0326669 | A1 * | 12/2012 | Horiyama | B25H 3/006 | 320/113 |
| 2013/0048631 | A1 * | 2/2013 | Van Der Linde | B25F 5/02 | 206/349 |
| 2013/0118938 | A1 * | 5/2013 | Huang | B65D 85/00 | 206/349 |
| 2013/0155657 | A1 * | 6/2013 | Werner | B65D 85/00 | 206/349 |
| 2013/0248390 | A1 * | 9/2013 | Roehm | B65D 85/00 | 206/216 |
| 2013/0277256 | A1 * | 10/2013 | Green | B25H 3/006 | 206/372 |
| 2014/0166516 | A1 * | 6/2014 | Martinez | B25H 3/02 | 206/372 |
| 2014/0183075 | A1 * | 7/2014 | Horiyama | B25H 3/02 | 206/349 |
| 2014/0312033 | A1 * | 10/2014 | Van Der Linde | B65D 25/10 | 206/349 |
| 2014/0340034 | A1 * | 11/2014 | Dietzel | B25H 3/022 | 320/108 |
| 2014/0353191 | A1 * | 12/2014 | DeCicco | B25H 3/022 | 206/373 |
| 2014/0374297 | A1 * | 12/2014 | Vilkomirski | B25H 3/025 | 206/373 |
| 2015/0283694 | A1 * | 10/2015 | Goto | G06Q 30/0621 | 705/26.5 |
| 2016/0053987 | A1 * | 2/2016 | Hsu | B25H 3/02 | 206/372 |
| 2016/0236342 | A1 * | 8/2016 | Evatt | B25H 3/003 | |
| 2017/0063114 | A1 * | 3/2017 | Briere | H02J 7/731 | |
| 2017/0197774 | A1 * | 7/2017 | Choi | B25H 3/006 | |
| 2017/0259424 | A1 * | 9/2017 | Vetter | B25H 3/006 | |
| 2018/0178371 | A1 * | 6/2018 | Weng | B25H 3/028 | |
| 2018/0250807 | A1 * | 9/2018 | Hunter | B25H 3/02 | |
| 2020/0324399 | A1 * | 10/2020 | Christen | B25H 3/022 | |
| 2021/0078157 | A1 * | 3/2021 | McDonnough | B29C 49/50 | |
| 2021/0078159 | A1 * | 3/2021 | Jiang | B65D 21/0213 | |
| 2021/0245360 | A1 * | 8/2021 | Hohl | B25H 3/003 | |
| 2021/0387325 | A1 * | 12/2021 | Heath | B25H 3/023 | |
| 2021/0394354 | A1 * | 12/2021 | Miley | B25H 3/003 | |
| 2022/0081193 | A1 * | 3/2022 | Cauley, Jr. | A47G 21/14 | |
| 2022/0176541 | A1 * | 6/2022 | Lai | B25H 3/003 | |
| 2022/0226981 | A1 * | 7/2022 | Adams | B25H 3/02 | |
| 2022/0355462 | A1 * | 11/2022 | Cho | B25H 3/021 | |
| 2023/0078495 | A1 * | 3/2023 | Williams | B25H 3/02 | 362/154 |
| 2023/0150109 | A1 * | 5/2023 | Chiang | B25H 3/006 | 206/375 |
| 2023/0173655 | A1 * | 6/2023 | Page | B25H 3/022 | 206/372 |
| 2024/0100683 | A1 * | 3/2024 | Hong | B25H 3/006 | |
| 2025/0197058 | A1 * | 6/2025 | Knauth | B65D 43/22 | |

FOREIGN PATENT DOCUMENTS

| | | | |
|---|---|---|---|
| DE | 20 2010 000 340 | U1 | 7/2010 |
| DE | 20 2013 002 314 | U1 | 5/2013 |
| DE | 20 2015 101 261 | U1 | 4/2015 |
| DE | 20 2017 103 624 | U1 | 9/2017 |
| GB | 2500476 | A | 9/2013 |

* cited by examiner

TOOL BOX FOR HAND-HELD POWER TOOL

This application claims priority under 35 U.S.C. § 119 to patent application no. DE 10 2022 210 256.8, filed on Sep. 28, 2022 in Germany, the disclosure of which is incorporated herein by reference in its entirety.

BACKGROUND

The disclosure relates to a tool box having a base element and a cover, wherein the base element and the cover form a box interior for receiving at least one hand-held power tool and having a locking tab for locking the cover to the base element.

Such a tool box for receiving a hand-held power tool is known in the prior art. The tool box has a base element and a cover forming a box interior. In the box interior, a hand-held power tool can be arranged. A locking tab is provided for locking the cover to the base element.

SUMMARY

The disclosure relates to a tool box having a base element and a cover, wherein the base element and the cover form a box interior for receiving at least one hand-held power tool and having a locking tab for locking the cover to the base element. The locking tab includes an insertion tool holding device for holding at least one insertion tool.

The disclosure thus enables the provision of a tool box in which simple and compact receiving of an insertion tool in or on the tool box can be enabled by the locking tab with the insertion tool holding device.

Preferably, the insertion tool holding device is arranged on a side of the locking tab facing a box interior, wherein the inside of the box is arranged facing the base element and the cover in the closed state of the tool box.

Thus, a safe and protected arrangement of the insertion tool holder device, or at least one insertion tool, can be enabled on the tool box.

Preferably, the insertion tool holding device is arranged on a side of the locking tab facing a box exterior, which is arranged facing away from the base element and the cover in the closed state of the tool box.

Thus, an alternative arrangement of the insertion tool holding device, or at least one insertion tool, can be enabled on the tool box.

The insertion tool holding device preferably comprises at least one insertion tool holding portion formed in one piece with the locking tab.

Thus, a stable and robust configuration of the insertion tool holding portion may be enabled as an integral part of the locking tab.

Preferably, the insertion tool holding device comprises at least one fixation portion for fixing an insertion tool holding unit, wherein the at least one fixation portion is formed in one piece with the locking tab.

Thus, a secure and reliable fixation as well as a reversible arrangement of the insertion tool holding unit on the locking tab can be enabled.

Preferably, the insertion tool holding unit comprises a positioning web that can be inserted in the fixation portion of the locking tab.

Thus, a light and straightforward fixation of the insertion tool holding unit to the locking tab can be enabled.

Preferably, the insertion tool holding unit has at least one latching portion which can be latched to the fixation portion of the locking tab configured as a latching hook.

Thus, an alternative fixation of the insertion tool holding unit to the locking tab may be enabled in a simple manner.

According to one embodiment, the insertion tool holding unit comprises at least one receptacle for receiving an insertion tool, wherein the receptacle comprises at least one fixation portion for releasably fixing an insertion tool in the receptacle.

Thus, a safe and reliable arrangement of an insertion tool in the insertion tool holding unit may be enabled.

Preferably, the locking tab comprises at least one latching receptacle and the base element and/or the cover comprises a latching hook associated with the at least one latching receptacle for forming a latching connection.

Thus, a stable and robust locking of the locking tab on the base element and/or cover can be enabled by a latching connection of the locking tab.

According to one embodiment, the base element and the cover each form a recess, wherein the locking tab is arranged in the recess in the closed state of the tool box.

Thus, a compact tool box can be easily provided.

BRIEF DESCRIPTION OF THE DRAWINGS

The disclosure is explained in further detail in the following description with reference to exemplary embodiments shown in the drawings. Shown are.

DETAILED DESCRIPTION

Figure 1:
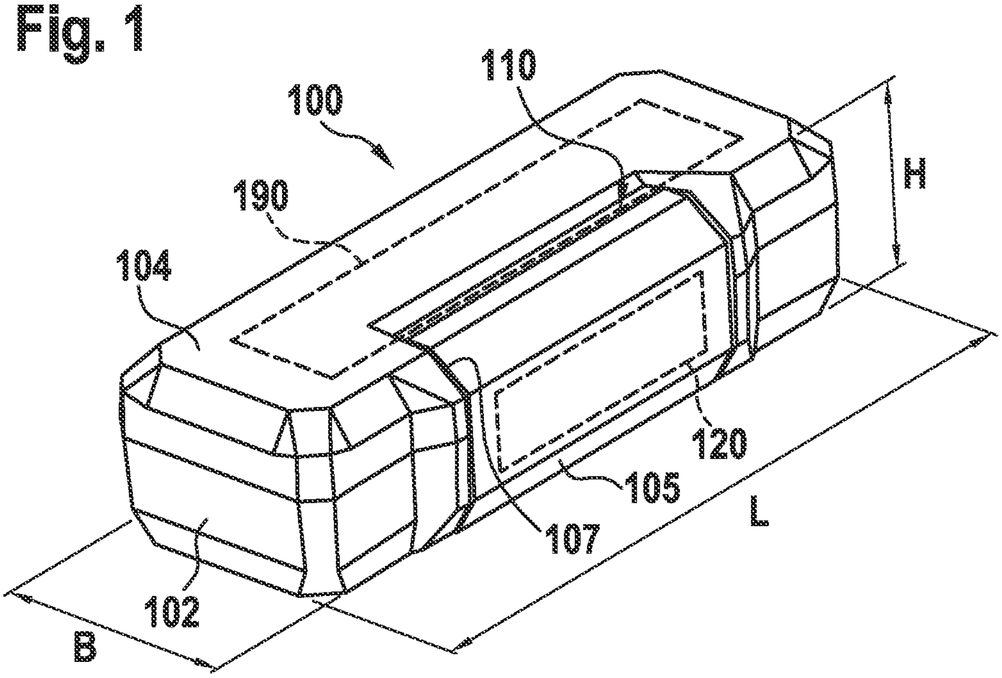
FIG. 1 a perspective view of a tool box having a base element, a cover, and a locking tab, FIG. 2 a perspective view of the base element of FIG. 1 with a hand-held power tool, FIG. 3 a front perspective view of the base element and the cover of the tool box of FIG. 1 and FIG. 2, FIG. 4 a perspective view of the locking tab of the tool box from FIG. 1 to FIG. 3 viewed from an inner side, FIG. 5 a perspective view of the locking tab of FIG. 4 with an insertion tool holding unit and insertion tools, FIG. 6 a perspective view of the insertion tool holding unit with the insertion tools of FIG. 5 as viewed from a front side, and FIG. 7 a perspective view of the insertion tool holding unit of FIG. 6 as viewed from a rear side.

Elements having the same or a comparable function are provided with the same reference numerals in the figures and are described in detail only once.

FIG. 1 illustrates an exemplary tool box 100 having a base element 102 and a cover 104 that preferably form a box interior (210 in FIG. 2) for storage and/or transportation of at least one schematically indicated transport object 190. Preferably, the transport object 190 is a preferably compact hand-held power tool. According to one embodiment, the transport object 190 is configured as a rod screwdriver, in particular a battery operated rod screwdriver.

The illustratively compact tool box 100 has a width B, a length L, and a height H. Preferably, the length L is between 200 mm and 250 mm and is preferably 220 mm. Preferably, the width B is between 80 mm and 100 mm and is preferably 80 mm. Furthermore, the height H is preferably between 50 mm and 70 mm and is preferably 55 mm.

The cover 104 and/or the base element 102 are preferably semi-shell shaped. Preferably, the tool box 100 can be locked via a locking tab 105. Here, in the configuration shown in FIG. 1, the locking tab 105 is configured to lock the cover 104 to the base element 102. However, the locking tab 105 may also be configured to lock the base element 102 to the cover 104.

Locking of the tool box 100, i.e., the cover 104 on the base element 102 or vice versa, is preferably accomplished via a suitable locking connection 110. Preferably, the locking connection 110 is configured as a latching connection. However, the locking connection 110 may also be configured in the manner of any other connection, e.g., as a clamp connection, a connection via a locking element such as a locking latch, etc.

Preferably, the base element 102 and the cover 104 each form a recess 107, wherein the locking tab 105 is arranged in the recess 107 in the closed state of the tool box 100 shown in FIG. 1. According to the disclosure, the locking tab 105 comprises an insertion tool holding device 120 for holding at least one insertion tool (530 in FIG. 5).

Figure 2:
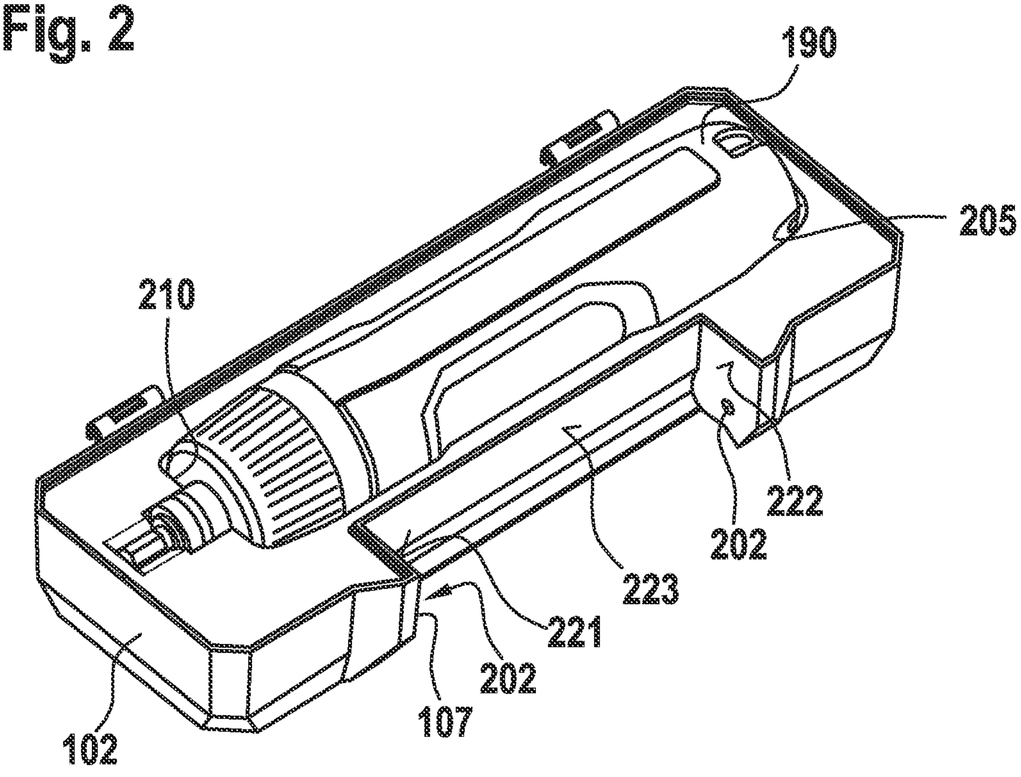

FIG. 2 shows the base element 102 of the tool box 100 of FIG. 1. The base element 102 preferably comprises a receptacle 205 for partially receiving a hand-held power tool 190 configured herein as a rod screwdriver. Preferably, the cover 104 of FIG. 1, analogously to the base element 102, comprises a receptacle 205 for partially receiving the hand-held power tool 190, wherein the two receptacles 205 form a box interior 210.

Furthermore, FIG. 2 illustrates the recess 107 for arranging the locking tab 105 of FIG. 1. The recess 107 is preferably formed rectangularly with two opposing side surfaces 221, 222 and a connecting surface 223. The connection surface 223 is arranged at least approximately perpendicular to the side surfaces 221, 222. Preferably, the two side surfaces 221, 222 each comprise a storage receptacle 202 for pivotally supporting the locking tab 105 of FIG. 1. However, the storage receptacles 202 may also be formed on the cover 104 of FIG. 1. The recess 107 can also have an alternative shape, e.g., oval. It is noted that the tool box 100 may alternatively also be configured without a recess 107.

Figure 3:
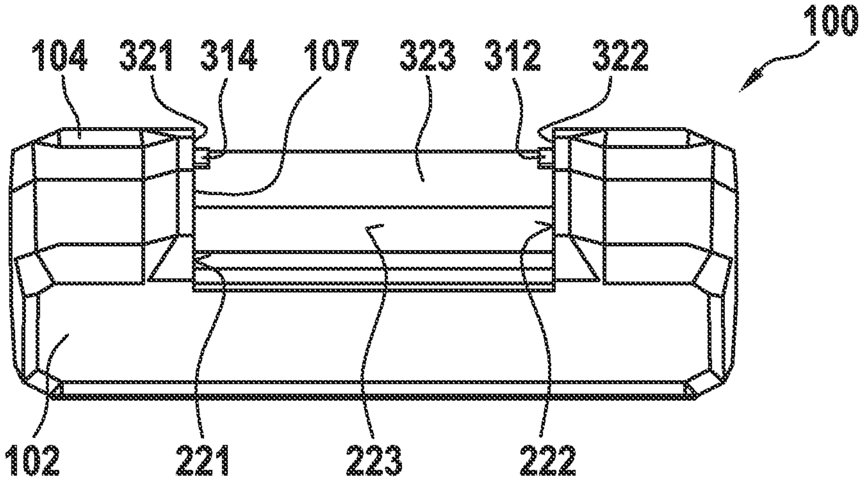

FIG. 3 shows the tool box 100 of FIG. 1 with the base element 102 and the cover 104, but without the locking tab 105 of FIG. 1. Preferably, the recess 107 is also formed in the cover 104, wherein the cover 104 comprises two opposing side surfaces 321, 322 and a connection surface 323 analogously to the base element 102. To form a preferred latching connection with the locking tab 105, the cover 104 comprises at least one latching hook 312, 314. Illustratively, two opposingly arranged latching hooks 312, 314 are provided. The latching hooks 312, 314 are arranged on the side surfaces 321, 322.

It is noted that the at least one latching hook 312, 314 may also be arranged on the base element 102. Furthermore, at least one latching hook 312, 314 may also be arranged on the cover 104 and at least one latching hook 312, 314 may be arranged on the base element 102.

Figure 4:
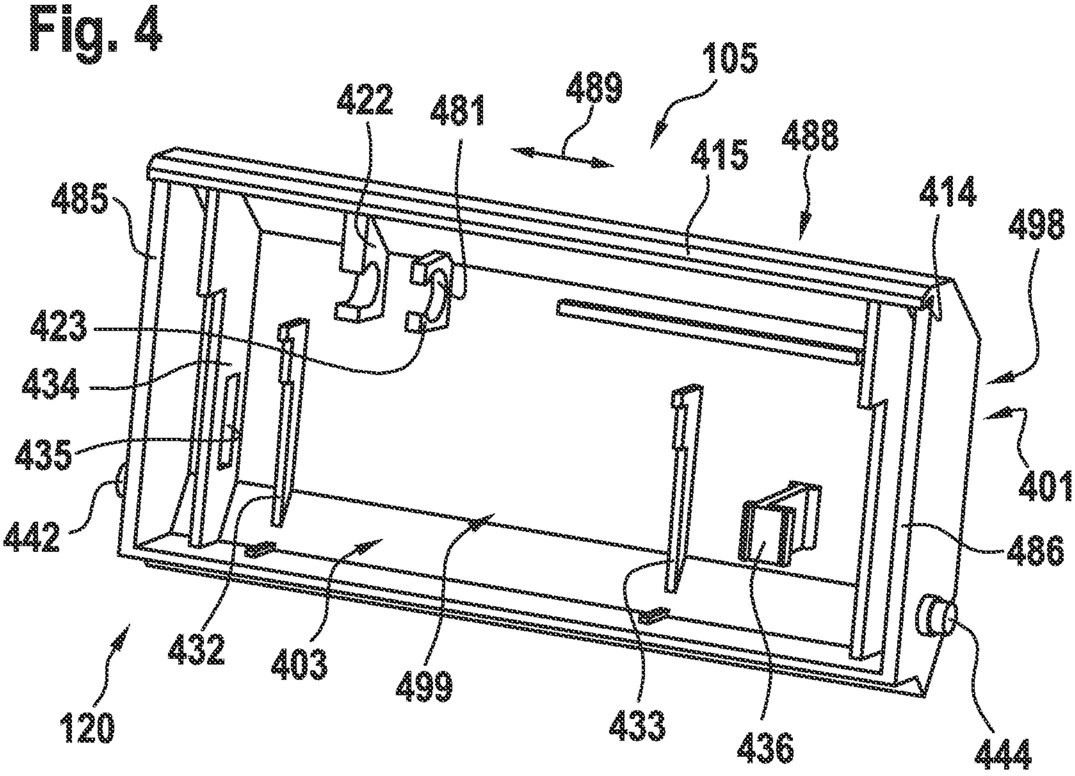

FIG. 4 shows the locking tab 105 of the tool box 100 of FIG. 1 and FIG. 3 as viewed from its side 499 facing a box interior 403. The box interior 403 is arranged facing the base element 102 and the cover 104 in the closed state of the tool box 100 of FIG. 1.

Preferably, the insertion tool holding device 120 of FIG. 1 is arranged on the side 499 of the locking tab 105 facing the box interior 403. Preferably, the insertion tool holding device 120 comprises at least one and illustratively two insertion tool holding portions 422, 423. Preferably, each of the illustrative two insertion tool holding portions 422, 423 is configured to each releasably hold an insertion tool, in particular a screwdriver bit, a drill bit, and/or a bit extension.

According to one embodiment, the insertion tool holding portions 422, 423 are formed in one piece with the locking tab 105. However, the insertion tool holding portions 422, 423 may also be fixed to the locking tab 105 via any connection, e.g., an adhesive, welded, and/or screw connection. Preferably, the insertion tool holding portions 422, 423 comprise at least an approximately semicircular receptacle 481 for reversibly receiving an insertion tool.

Figure 5:
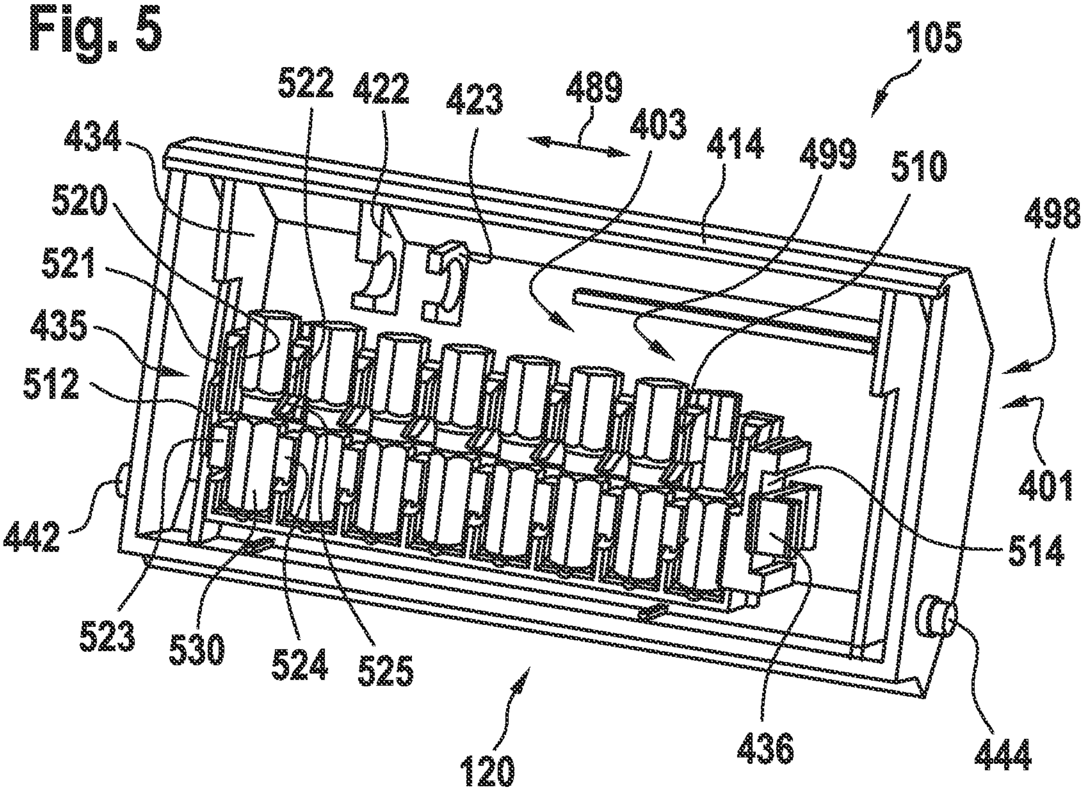

Alternatively or optionally, the insertion tool holding device 120 comprises at least one fixation portion 434, 435, 436 for fixing an insertion tool holding unit (510 in FIG. 5). Preferably, the at least one fixation portion 434, 435, 436 is formed in one piece with the locking tab 105. However, the at least one fixation portion 434, 435, 436 may be arranged analogous to the insertion tool holding portions 422, 423 via any connection, e.g., an adhesive, welded, and/or screw connection to the locking tab 105.

Illustratively, the fixation portion 434 is configured as a connecting portion against which the at least one fixation portion (521, 523 in FIG. 5) of the insertion tool holding unit (510 in FIG. 5) abuts. Furthermore, the fixation portion 434, which is formed as a recess, preferably as a rectangular recess, is arranged at the fixation portion 435. However, the fixation portion 435 may also have any other shape, e.g., an oval or round shape. The fixation portion 436 is configured as a latching hook and is configured to engage with the insertion tool holding unit (510 in FIG. 5).

Furthermore, the locking tab 105 along its longitudinal extension 489 between the fixation portions 434-436 preferably comprises at least one positioning portion 432, 433 for positioning the insertion tool holding unit (510 in FIG. 5). Preferably, the at least one positioning portion 432, 433 is formed in one piece with the locking tab 105.

Moreover, the locking tab 105 illustratively comprises two side walls 485, 486. The side walls 485, 486 are arranged parallel to the side faces 221, 222 of FIG. 2 and 321, 322 of FIG. 3 of the base element 102 and the cover 104 respectively. Preferably, a pivot pin 442, 444 is arranged on each side wall 485, 486 for pivotally mounting the locking tab 105 on the base element 102, in particular on the storage receptacles 202 of the base element 102 of FIG. 2.

Preferably, the locking tab 105 comprises at least one latching receptacle 414 for forming a latching connection with the base element 102 and/or the cover 104. Preferably, the latching receptacle 414 is configured to form a latching connection with the latching hooks 312, 314 of the cover 104 of FIG. 3. The latching receptacle 414 is associated with a connecting portion 415 facing the box interior 403 of the locking tab 105. The connecting portion 415 is illustratively arranged on a top side 488 of the locking tab 105. Illustratively, the connecting portion 415 is formed along the entire longitudinal extension 489 of the locking tab 105. However, the connecting portion 415 could also only be configured at the areas facing the side walls 485, 486.

It is noted that the insertion tool holding device 120 may alternatively be arranged on a side 498 of the locking tab 105 facing a box exterior 401. The box exterior 404 is arranged facing away from the base element 102 and the cover 104 in the closed state of the tool box 100.

FIG. 5 shows the locking tab 105 with the insertion tool holding device 120 of FIG. 4 and with an insertion tool holding unit 510, which is preferably releasably arranged on the locking tab 105. The insertion tool holding device 510 comprises at least one receptacle 520 for receiving an insertion tool 530. Preferably, the at least one receptacle 520 comprises at least one fixation portion 521, 522, 523, 524, 525 for releasably fixing an insertion tool 530 in the at least one receptacle 520. Eight insertion tools configured as screwdriver bits are shown illustratively, wherein only one insertion tool is provided with a reference number, i.e., the insertion tool 530.

At its illustrative left end, the insertion tool holding unit 510 has a positioning web 512, which can be inserted into the fixation portion 435 of the locking tab 105. For this purpose, the positioning web 512 and the fixation portion 435 have corresponding shapes. Moreover, the insertion tool holding unit 510 has a latching portion 514 at its illustrative right end. Preferably, the latching portion 514 can be latched to the fixation portion 436 of the locking tab 105, which is formed as a latching hook. It is noted that the positioning web 512 and the latching portion 514 may also be arranged laterally reversed, such that the positioning web 512 may be arranged illustratively to the right and the latching portion 514 may be arranged illustratively to the left. Preferably, the positioning web 512 and the latching portion 514 are arranged opposite each other.

The positioning web 512 may alternatively also be arranged on a longitudinal side that is aligned parallel to the longitudinal extension 489 of the locking tab 105. Furthermore, the insertion tool holding unit 510 may alternatively also comprise a latching portion 514 on both sides for latching to the locking tab 105 on both sides. Moreover, the locking tab 105 may also comprise the positioning web 512 and the insertion tool holding unit 510 has a receptacle for the positioning web 512.

According to one embodiment, the locking tab 105 comprises at least one insertion tool holding portion 422, 423 for direct arrangement of at least one insertion tool and/or at least one releasable insertion tool holding unit 510, which can be arranged on the locking tab 105. Preferably, the insertion tool holding device 510 is configured as a bit magazine.

Figure 6:
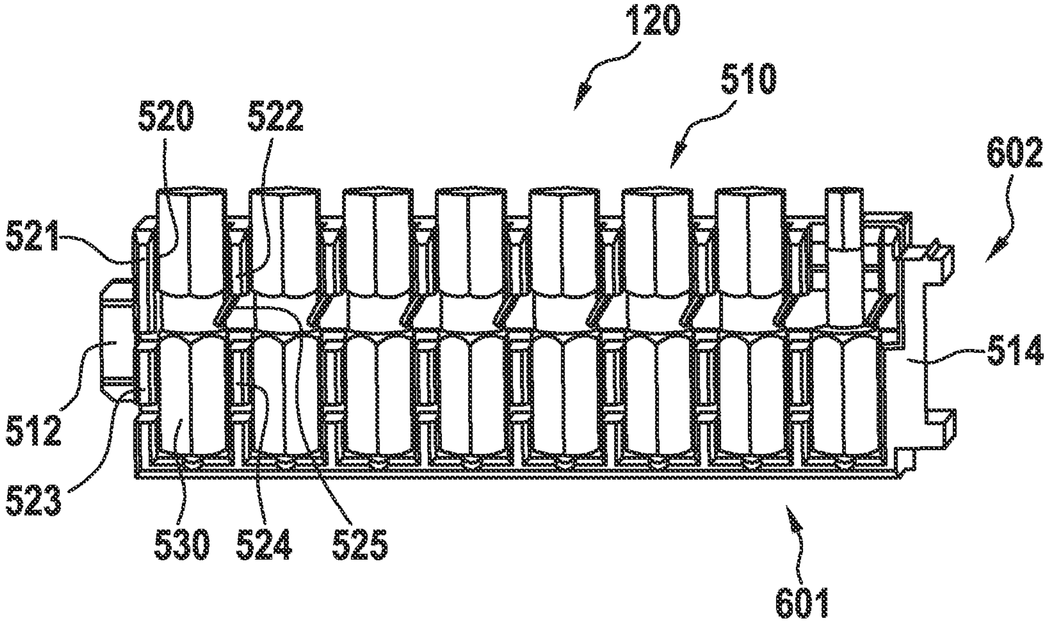

FIG. 6 shows the insertion tool holding unit 510 of FIG. 5 with insertion tools 530 having a front side 601 and a rear side 602. FIG. 6 illustrates the opposing arrangement of the positioning web 512 and the latching portion 514. In this respect, FIG. 6 shows the at least approximately C-shaped configuration of the latching portion 514.

Figure 7:
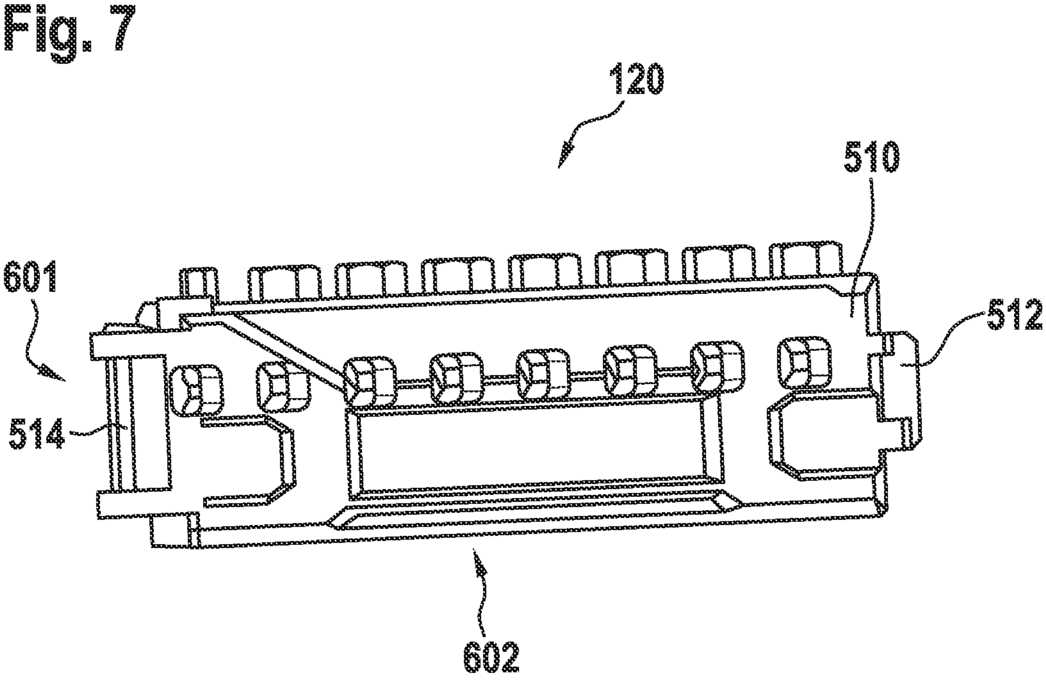

FIG. 7 shows the insertion tool holding unit 510 of FIG. 5 and FIG. 6 as viewed from the rear side 602. FIG. 7 also illustrates the positioning web 512 and the latching portion 514.

The invention claimed is:

1. A tool box, comprising:

a base element;

a cover, wherein the base element and the cover form, in a closed state of the tool box, a box interior configured to receive at least one hand-held power tool;

a locking tab configured to lock the cover to the base element in the closed state, the locking tab defining an interior cavity configured to hold at least one insertion tool used by the at least one hand-held power tool and an insertion tool holding device disposed in said interior cavity, wherein the locking tab is pivotably mounted to said base element; and an insertion tool holding unit configured to hold multiple insertion tools, wherein the insertion tool holding device comprises at least one fixation portion configured to fix the insertion tool holding unit within said interior cavity, and the at least one fixation portion is formed in one piece with the locking tab, and wherein said locking tab includes at least one latching receptacle and said cover includes at least one latching hook configured to engage the at least one latching receptacle to lock the cover to the base element in the closed state, so that said insertion tool holding device is separate from said box interior when the cover is locked to the base element.

2. The tool box according to claim 1, wherein:

the interior cavity and insertion tool holding device is arranged on a side of the locking tab facing the box interior, and the box interior is arranged facing the base element and the cover in the closed state of the tool box.

3. The tool box according to claim 1, wherein:

the interior cavity and insertion tool holding device is arranged on a side of the locking tab facing a box exterior of the tool box, and the box exterior is arranged facing the base element and the cover in the closed state of the tool box.

4. The tool box according to claim 1, wherein the insertion tool holding device comprises at least one insertion tool holding portion formed in one piece with the locking tab.

5. The tool box according to claim 1, wherein the insertion tool holding unit comprises a positioning web configured to be inserted in the at least one fixation portion.

6. The tool box according to claim 1, wherein the insertion tool holding unit comprises at least one latching portion configured to be latched to the at least one fixation portion configured as the latching hook.

7. The tool box according to claim 1, wherein:

the insertion tool holding unit comprises at least one receptacle configured to receive the at least one insertion tool, and the receptacle comprises at least one fixation portion configured to releasably fix the at least one insertion tool in the receptacle.

8. The tool box according to claim 1, wherein:

the base element and the cover each form a recess, and the locking tab is arranged in the recess in the closed state of the tool box.

9. A tool box, comprising:

a base element;

a cover, wherein the base element and the cover form, in a closed state of the tool box, a box interior configured to receive at least one hand-held power tool;

a locking tab configured to lock the cover to the base element in the closed state, the locking tab defining an interior cavity configured to hold at least one insertion tool used by the at least one hand-held power tool and an insertion tool holding device disposed in said interior cavity, wherein the locking tab is pivotably mounted to said base element;

an insertion tool holding unit configured to hold multiple insertion tools, wherein the insertion tool holding device comprises at least one fixation portion configured to fix the insertion tool holding unit within said interior cavity, and the at least one fixation portion is formed in one piece with the locking tab; and a latching interface between said locking tab and said cover configured to lock the cover to the base element in the closed state, so that said insertion tool holding device is separate from said box interior when the cover is locked to the base element.

10. The tool box according to claim 9, wherein said locking interface includes at least one latching receptacle in said locking tab and said cover includes at least one latching hook configured to engage the at least one latching receptacle.

11. The tool box according to claim 9, wherein:

the interior cavity and insertion tool holding device is arranged on a side of the locking tab facing a box exterior of the tool box, and the box exterior is arranged facing the base element and the cover in the closed state of the tool box.

12. The tool box according to claim 9, wherein:

the interior cavity and insertion tool holding device is arranged on a side of the locking tab facing a box exterior of the tool box, and the box exterior is arranged facing the base element and the cover in the closed state of the tool box.

13. The tool box according to claim 9, wherein the insertion tool holding device comprises at least one insertion tool holding portion formed in one piece with the locking tab.

14. The tool box according to claim 9, wherein the insertion tool holding unit comprises a positioning web configured to be inserted in the at least one fixation portion.

15. The tool box according to claim 9, wherein the insertion tool holding unit comprises at least one latching portion configured to be latched to the at least one fixation portion configured as the latching hook.

16. The tool box according to claim 9, wherein:

the insertion tool holding unit comprises at least one receptacle configured to receive the at least one insertion tool, and the receptacle comprises at least one fixation portion configured to releasably fix the at least one insertion tool in the receptacle.

17. The tool box according to claim 9, wherein:

the base element and the cover each form a recess, and the locking tab is arranged in the recess in the closed state of the tool box.

* * * * *